(12) United States Patent
Choi et al.

(10) Patent No.: US 11,604,959 B2
(45) Date of Patent: Mar. 14, 2023

(54) ARTIFICIAL INTELLIGENCE-BASED APPARATUS AND METHOD FOR PROVIDING WAKE-UP TIME AND BED TIME INFORMATION

(71) Applicant: LG ELECTRONICS INC., Seoul (KR)

(72) Inventors: Ilhwan Choi, Seoul (KR); Soojin Lee, Seoul (KR); Sunghyun Park, Seoul (KR); Munho Yun, Seoul (KR); Jinhwa Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 625 days.

(21) Appl. No.: 16/568,021

(22) Filed: Sep. 11, 2019

(65) Prior Publication Data

US 2020/0005121 A1 Jan. 2, 2020

(30) Foreign Application Priority Data

Aug. 6, 2019 (KR) .......................... 10-2019-0095681

(51) Int. Cl.
*G06N 3/04* (2006.01)
*G06N 3/08* (2006.01)
*H04L 67/12* (2022.01)

(52) U.S. Cl.
CPC ............. *G06N 3/0427* (2013.01); *G06N 3/08* (2013.01); *H04L 67/12* (2013.01)

(58) Field of Classification Search
CPC ........ G06N 3/0427; G06N 3/08; G06N 3/008; H04L 67/12; H04M 1/72403; H04M 2201/34; H04M 2250/12
See application file for complete search history.

(56) References Cited

U.S. PATENT DOCUMENTS 9,942,355 B2 * 4/2018 Siracusa ................. G06F 11/30
10,108,150 B1 * 10/2018 Gheorghita ............ G04G 15/00
10,216,551 B1 * 2/2019 Jha ......................... G06F 16/00
(Continued)

FOREIGN PATENT DOCUMENTS

CN 104503255 A * 4/2015
JP 2007334582 A * 12/2007
(Continued)

*Primary Examiner* — Joseph H Feild
*Assistant Examiner* — Rufus C Point
(74) *Attorney, Agent, or Firm* — Lee, Hong, Degerman, Kang & Waimey PC

(57) ABSTRACT

Disclosed herein are an artificial intelligence-based apparatus and method for providing wake-up and bed time information. The artificial intelligence-based apparatus for providing wake-up and bed time information includes a communication unit configured to receive usage information for an electronic device used by a user from the electronic device; a memory configured to store the usage information; and a processor configured to load the usage information from the memory, analyze usage time of the electronic device, extract a life pattern of the user, and predict an average wake-up or bed time of the user based on the life pattern. According to the embodiment of the present invention, it is possible to provide services for tasks which the user needs to do at the wake-up or bed time and provide convenience to the user.

11 Claims, 6 Drawing Sheets

(56) References Cited

U.S. PATENT DOCUMENTS

| | | | | |
|---|---|---|---|---|
| 10,491,708 | B2* | 11/2019 | Siracusa | G06F 11/3024 |
| 10,594,835 | B2* | 3/2020 | Brown | G06F 8/61 |
| 2012/0106423 | A1* | 5/2012 | Nylander | H04W 52/0241 |
| | | | | 370/311 |
| 2012/0159639 | A1* | 6/2012 | Noh | G06F 21/6254 |
| | | | | 726/26 |
| 2012/0209439 | A1* | 8/2012 | Inoue | G06Q 10/04 |
| | | | | 702/181 |
| 2016/0335401 | A1* | 11/2016 | Kawai | G16H 40/63 |
| 2016/0360008 | A1* | 12/2016 | Brown | G06F 11/3055 |
| 2016/0360382 | A1* | 12/2016 | Gross | G06F 9/453 |
| 2018/0060732 | A1* | 3/2018 | Yuan | A61B 5/4812 |
| 2018/0278740 | A1* | 9/2018 | Choi | G06F 3/04847 |
| 2019/0087293 | A1* | 3/2019 | Jeong | G06F 9/453 |
| 2019/0160251 | A1* | 5/2019 | Shanmugam | A61M 21/02 |
| 2019/0347181 | A1* | 11/2019 | Cranfill | G06F 21/629 |
| 2020/0027456 | A1* | 1/2020 | Kim | G06N 5/025 |

FOREIGN PATENT DOCUMENTS

| | | | |
|---|---|---|---|
| KR | 20170133114 A | * | 12/2017 |
| KR | 20180054367 A | * | 5/2018 |

* cited by examiner

ARTIFICIAL INTELLIGENCE-BASED APPARATUS AND METHOD FOR PROVIDING WAKE-UP TIME AND BED TIME INFORMATION

CROSS-REFERENCE TO RELATED APPLICATIONS

Pursuant to 35 U.S.C. § 119(a), this application claims the benefit of earlier filing date and right of priority to Korean Patent Application No. 10-2019-0095681, filed on Aug. 6, 2019, the contents of which are hereby incorporated by reference herein in its entirety.

BACKGROUND

The present invention relates to an artificial intelligence-based apparatus and method for providing wake-up and bed time information.

Artificial intelligence is a field of computer engineering and information technology that research a method for allowing computers to do thinking, learning, self-development or the like that can be done by human intelligence, and means that computers is allowed to imitate human intelligent behavior.

In addition, the artificial intelligence does not exist by itself, but is directly or indirectly related to other fields of computer science. Especially, artificial intelligent factors have been introduced in the various field of information technology, and it has been actively attempted to utilize them to solve problems in the field.

On the other hand, recently, technologies for applying artificial intelligence to home appliances to operate for various purposes have been tried. Home appliances are controlled in a form that is automatically programmed for the purpose without human intervention. For example, in the case of an air conditioner to which the artificial intelligence is applied, a wind direction and a wind speed are automatically adjusted, and a temperature is automatically controlled, thereby providing convenience to the user and reducing power loss.

In this regard, Korean Patent Publication No. 10-2004-0051344 (Method for controlling sleep function of portable information terminal) discloses a method of controlling a sleep function of a portable information terminal which prevents the portable information terminal from operating in a sleep mode when the user does not want it, and allowing the portable information terminal to operate in the sleep mode when the user wants it.

Since the conventional technology provides a service based on a bed time input by the user, there is a problem in that the time is not automatically set to reflect the life pattern of the user.

In addition, because the set mode or time is a fixed value, there is a problem that it is difficult to reflect weekend, weekday, vacation period, and the like.

SUMMARY

The present invention extracts usage information through a mobile device used by a user, analyzes a life pattern, and accurately predicts the user's wake-up or bed time.

The present invention provides convenience to a user by controlling a peripheral device of a user or providing a power saving function by utilizing a user's predicted wake-up or bed time.

According to an aspect of the present invention, an artificial intelligence-based apparatus for providing wake-up and bed time information include a communication unit configured to receive usage information for an electronic device used by a user from the electronic device; a memory configured to store the usage information; and a processor configured to load the usage information from the memory, analyze usage time of the electronic device, extract a life pattern of the user, and predict an average wake-up or bed time of the user based on the life pattern.

According to an embodiment, the processor may feedback-control a peripheral device of the user according to the wake-up or bed time.

According to an embodiment, the usage information may include at least one of mobile information indicating usage time of a mobile device and types of apps used during the usage time, motion information indicating physical movement time of the mobile device, and peripheral device usage information indicating usage information of an electronic device which interworks with a network used by the user and operates based on internet of thing (IoT).

According to an embodiment, the processor may sort apps used by the user based on the mobile information and predict the wake-up time or the bed time by extracting a start time or an end time of use of the apps.

According to an embodiment, when a difference of the start time or the end time of use of the apps is greater than or equal to a predetermined average sleep time, the processor may recognize the end time of use of the apps as the bed time and predict the start time of use of the apps as the wake-up time.

According to an embodiment, the processor may recognize a time when movement of the mobile device ends as the bed time and recognize a time when movement of the mobile device starts as the wake-up time, based on the motion information.

According to an embodiment, the processor may recognize a time when use of a peripheral device ends as the bed time and recognize a time when use of the peripheral device starts as the wake-up time, based on the peripheral device usage information.

According to an embodiment, the processor may extract a start time and an end time of use by the user corresponding to at least one of the mobile information, the motion information, and the peripheral device usage information included in the usage information, and predict the wake-up or bed time by analyzing or comparing the start time and the end time.

According to an embodiment, the processor may control an operation of the peripheral device according to the predicted wake-up time or bed time.

According to an aspect of the present invention, an artificial intelligence-based method for providing wake-up and bed time information includes receiving usage information for an electronic device used by a user from the electronic device; loading the usage information from the memory, analyzing usage time of the electronic device, and extracting a life pattern of the user, and predicting an average wake-up or bed time of the user from the life pattern.

According to an embodiment, the artificial intelligence-based method may further include feedback-controlling a peripheral device of the user according to the wake-up or bed time.

According to an embodiment, the usage information includes at least one of mobile information indicating usage time of a mobile device and types of apps used during the usage time, motion information indicating physical movement time of the mobile device, and peripheral device usage information indicating usage information of an electronic device which interworks with a network used by the user and operates based on internet of thing (IoT).

According to an embodiment, the predicting of the average wake-up or bed time of the user includes arranging apps used by the user based on the mobile information, determining whether a difference of a start time or an end time of use of the apps is greater than or equal to a predetermined average sleep time, and predicting the wake-up or bed time by extracting the start time or the end time of use of the apps.

According to an embodiment, the predicting of the average wake-up or bed time of the user may include recognizing a time when movement of the mobile device ends as the bed time and recognizing a time when movement of the mobile device starts as the wake-up time, based on the motion information.

According to an embodiment, the predicting of the average wake-up or bed time of the user may include extracting a start time and an end time of use by the user corresponding to at least one of the mobile information, the motion information, and the peripheral device usage information included in the usage information, and analyzing or comparing the start time and the end time to predict the wake-up or bed time.

According to an embodiment, the analyzing or comparing of the start time and the end time may include predicting the wake-up or bed time based on the mobile information and the motion information, and comparing the wake-up or bed time predicted based on the mobile information and the motion information with the wake-up or bed time predicted based on the peripheral device usage information.

DETAILED DESCRIPTION OF THE PREFERRED EMBODIMENTS

Figure 1:
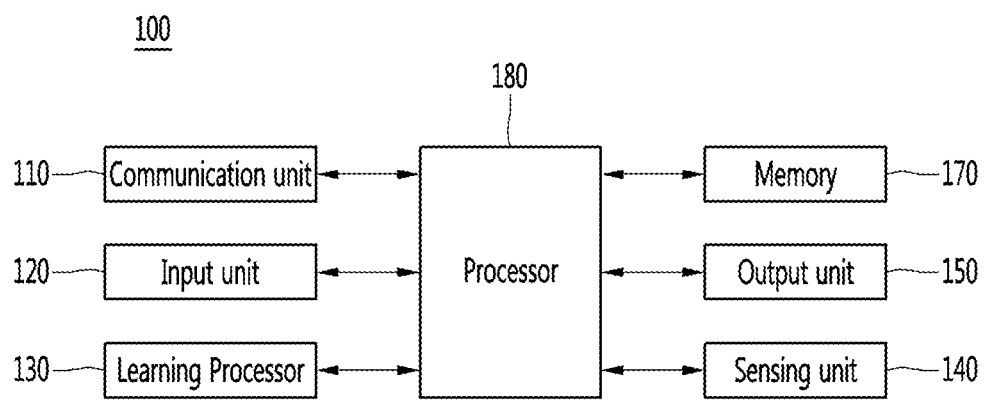
FIG. 1 illustrates an AI device according to an embodiment of the present invention.

Hereinafter, embodiments disclosed herein will be described in detail with reference to the accompanying drawings, and the same or similar elements are designated with the same numeral references regardless of the numerals in the drawings and their redundant description will be omitted. The suffixes "module" and "unit or portion" for components used in the following description are merely provided only for facilitation of preparing this specification, and thus they are not granted a specific meaning or function. In addition, when it is determined that the detailed description of the related known technology may obscure the gist of embodiments disclosed herein in describing the embodiments, a detailed description thereof will be omitted. Further, the accompanying drawings are intended to facilitate understanding of the embodiments disclosed herein, and the technical spirit disclosed herein is not limited by the accompanying drawings. Therefore, the present invention should be construed as including all the changes, equivalents, and substitutions included in the spirit and scope of the present invention.

The terms coming with ordinal numbers such as 'first', 'second', or the like may be used to denote various components, but the components are not limited by the terms. The terms are used merely for the purpose to distinguish a component from the other component.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-Driving

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

eXtended Reality (XR)

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
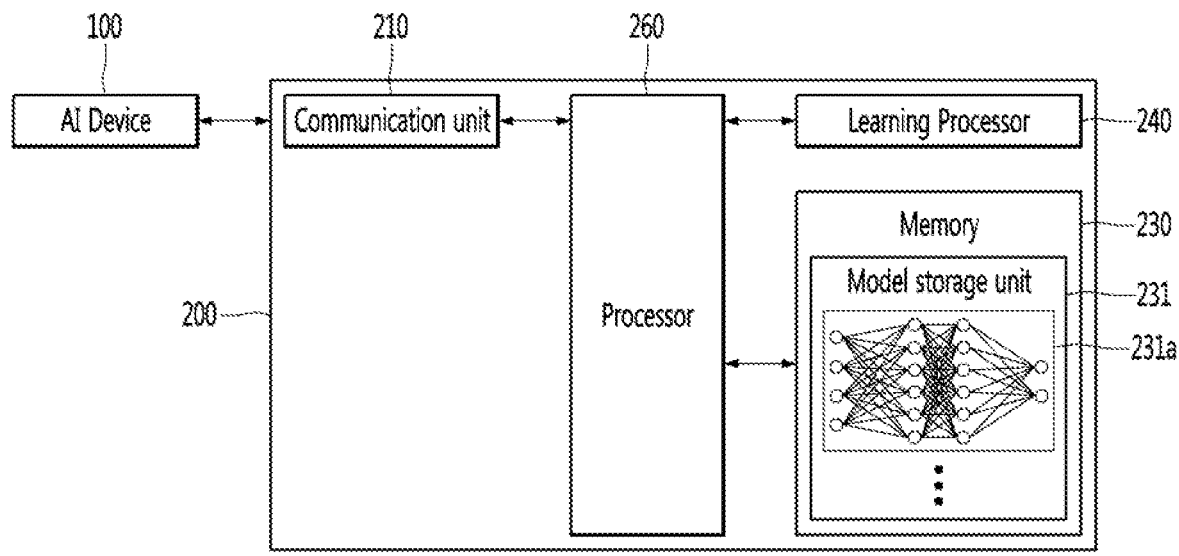
FIG. 2 illustrates an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
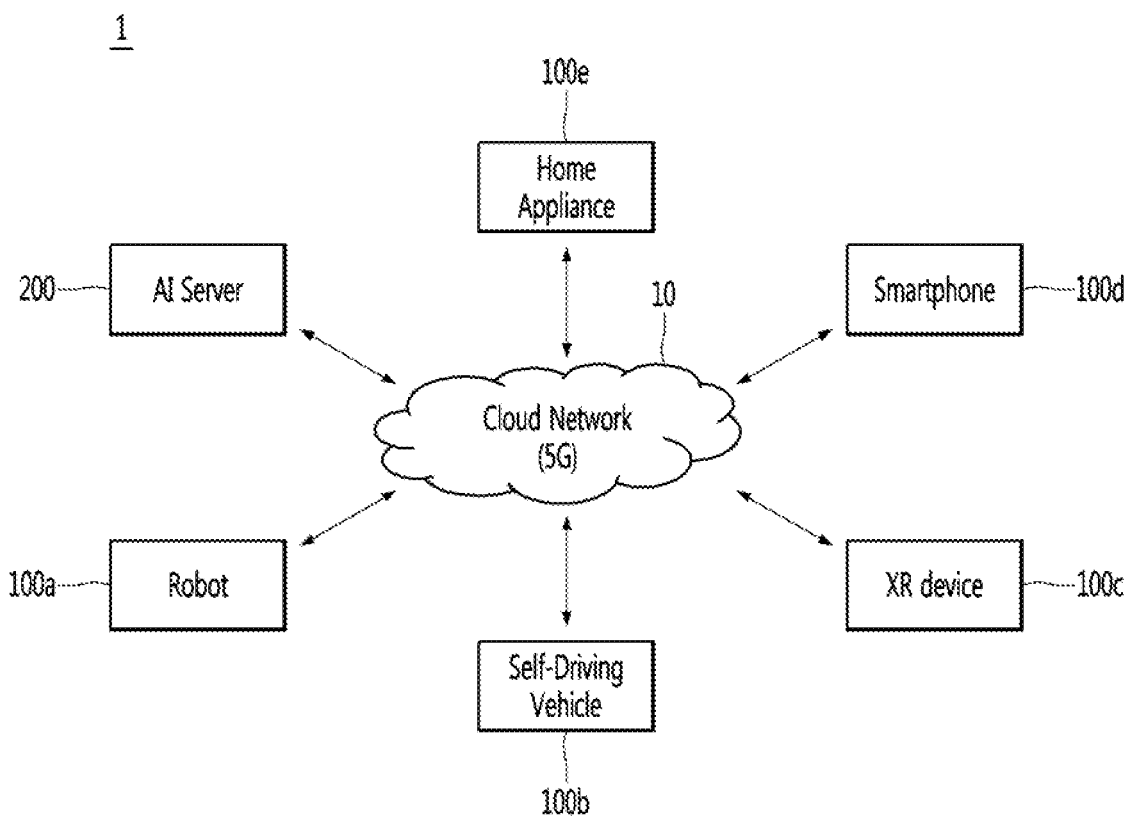
FIG. 3 illustrates an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

AI+Robot

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object.

The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
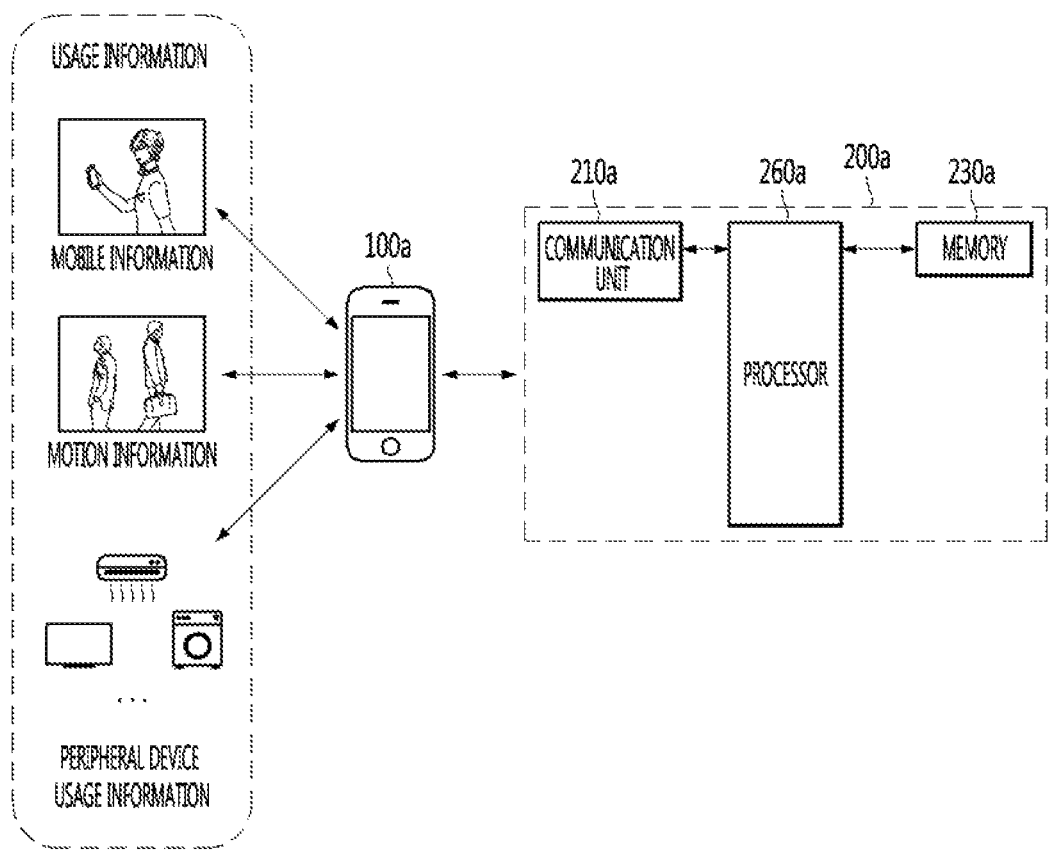
FIG. 4 is a configuration diagram of an artificial intelligence-based apparatus for providing wake-up and bed time information according to an embodiment of the present invention.

FIG. 4 is a configuration diagram of an artificial intelligence (AI)-based apparatus for providing wake-up and bed time information according to an embodiment of the present invention.

Referring to FIG. 4, the AI-based apparatus for providing wake-up and bed time information may include a communication unit 210a, a processor 260a, and a memory 230a.

The communication unit 210a may receive usage information for the electronic device from an electronic device used by a user.

The communication unit 210a may transmit/receive data to/from external devices such as other AI devices 100a to 100e or an AI server 200 using wired or wireless communication technology. For example, the communication unit 210a may transmit/receive sensor information, a user input, a learning model, a control signal, and the like to/from external devices.

The communication technology used by the communication unit 210a may include GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The memory 230a may store the usage information.

The memory 230a may store data that supports various functions of the AI device 100a. For example, the memory 230a may store the obtained usage information and provide it to the processor 260a. In addition, the memory 230a may store other input data, learning data, learning model, learning history, and the like.

The processor 260a may load the usage information from the memory 230a, analyze usage time of the electronic device to extract the life pattern of the user, and predict an average wake-up or bed time of the user from the life pattern.

The processor 260a may determine at least one executable operation of the AI device 100a based on information determined or generated using a data analysis algorithm or a machine learning algorithm. In addition, the processor 260a may control components of the AI device 100a to perform a determined operation.

To this end, the processor 260a may request, search for, receive, or utilize data of the running processor 260a or the memory 230a, and may control the components of the AI device 100a to perform an operation predicted or determined to be desirable among at least one executable operation.

When the association with an external device is required to perform a determined operation, the processor 260a may generate a control signal for controlling the external device and transmit the generated control signal to the external device.

The processor 260a may obtain intention information about a user input, and determine a requirement of the user based on the obtained intention information.

The processor 260a may feedback control a peripheral device of the user according to the wake-up or bed time.

The feedback control refers to controlling the peripheral device of the user again by using the wake-up or bed time predicted from the usage information, and means that the user is controlled through the usage information of the user.

The processor 260a may not only predict the wake-up or bed time from the usage information, but also set the wake-up or bed time again or set the wake-up or bed time again automatically by day, holiday, or weekday, or weekend based on the predicted time.

The processor 260a may receive usage information from the user and predict a time based on the usage information.

The usage information may include at least one of mobile information indicating the time when the user has used the mobile device and the types of apps used at the time, motion information indicating the physical movement time of the mobile device, or peripheral device usage information indicating usage information of electronic devices which interwork with a network used by the user and operate based on IOT.

The mobile information refers to a material that lists the apps used by the user by date and time, and may also include times at which the user turned on/off or charged the mobile device.

The processor 260a may sort apps used by the user from the mobile information, and extract the usage time or end time of the app to predict the wake-up or bed time.

That is, when the difference between the end time and the start time of use of the app is equal to or greater than a preset average sleep time, the processor 260a may recognizes the end time of use of the app as the bed time and predict the start time of user of the app as the wake-up time.

The motion information refers to data containing information on a time for which the user moves the mobile device. According to an embodiment of the present invention, it may be possible to classify a time during which the user moves the mobile device as the time for which there is activity, and the time during which there is another action or a sleep time as a time for which there is no activity.

That is, the processor 260a may recognize a time at which the movement of the mobile device ends as a bed time, and recognize a time at which the movement of the mobile device starts as a wake-up time, based on the motion information.

The processor 260a may identify the activity of the user through the motion information, and may determine whether the user is actually awake or sleeping through comparison with the mobile information.

The peripheral device usage information refers to a process of collecting usage information of electronic devices in the vicinity of the user other than the mobile device in order to predict the user's wake-up or bed time.

The peripheral device usage information may refer to electronic devices other than the mobile device of the user, but may include all IOT-based electronic devices that may be recognized by being connected to a network.

The processor 260a may recognize the end time of use as a bed time based on the usage information of the peripheral device, and may recognize the start time of use as a wake-up time. The actual wake-up or bed time may be predicted by comparing the mobile information with the motion information.

The processor 260a may extract a start time and an end time of use by the user, which correspond to at least one of mobile information, motion information, and peripheral device usage information included in the usage information, and predict the wake-up or bed time by analyzing or comparing the start time and the end time.

The processor 260a may list all times of each usage information, and derive a user's life pattern through all consideration factors such as date, time, weekday, and weekend. The user may arbitrarily set a collection period of such data, and an average wake-up or bed time may be predicted through the data within the set period.

In addition, the processor 260a may control the operation of the peripheral device in correspondence to the predicted wake-up or bed time.

The control of the peripheral device may include on/off control or power saving mode control of the peripheral device, but is not limited thereto and may include all methods of controlling the peripheral device in relation to the wake-up or bed time.

Figure 5:
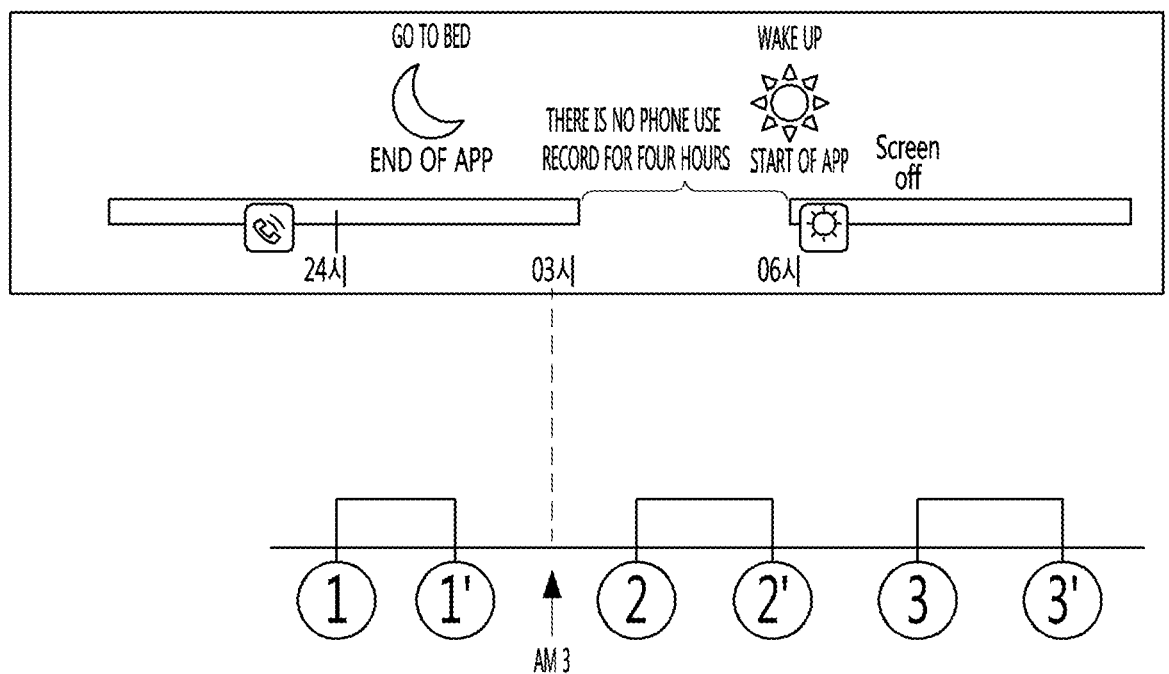
FIG. 5 illustrates a process of predicting a wake-up time and a bed time based on collected usage information according to an embodiment of the present invention.

FIG. 5 illustrates a process of predicting a wake-up time and a bed time based on collected usage information according to an embodiment of the present invention.

Referring to FIG. 5, an app usage record may be extracted from mobile information, and a time for which an app is not used may be primarily assumed to be a sleep time in consideration of only the mobile information.

According to an embodiment of the present invention, when the basic sleep time is assumed to be 4 hours, it is regarded that the user has slept when the time between the end time and the start time of use of the app exceeds 4 hours. Of course, the same phenomenon may occur during the day, but data for daytime may be excluded when considering the average number of repetitions.

In FIGS. 4, 1 to 1', 2 to 2', and 3 to 3' represent times of using specific apps, for example, 1', which is the end time when the last use of the app is finished, may be considered as a bed time with 3:00 am as a reference, and 2 may be considered as a wake-up time. It is noted that, when a period of time of 2 to 1' does not exceed four hours, it cannot be regarded as a bed time and a wake-up time.

In this case, 2' and 3, which are the end time and the start time of different apps, may be compared, and in this way, sequential comparisons may be performed. Here, each windowing section may be compared from 0 o'clock to 24 o'clock according to the order of the list of app use.

There is a limitation in prediction of times based on the mobile information only and therefore, the motion information and the peripheral device usage information may also be compared.

In a case when a certain time is predicted as a bed time, when an app is not used but the mobile device is moved during the certain time, the certain time is hard to be considered as the bed time. Therefore, in this case, the predicted bed time may be compared with the time point at which the motion information of the mobile device is finished, and thus, the bed time may be predicted in consideration of the time at which the last movement is finished.

For example, when a user wakes up but does not use the app, the motion information may be used. It may be possible to predict the wake-up time or bed time more accurately through the above-described usage information, such as predict a bed time through the peripheral device usage information when the user goes to bed one hour after watching TV without motion.

Embodiments of the present invention may be applied under the assumption that the user always carries the mobile device, and when the usage information of the user is sorted, the processor 260a may derive a certain life pattern to a certain extent. The process of controlling the peripheral device through this will be described with reference to FIG. 9.

A method of providing information on wake-up and bed time time information using the above-described apparatus will be described below.

Figure 6:
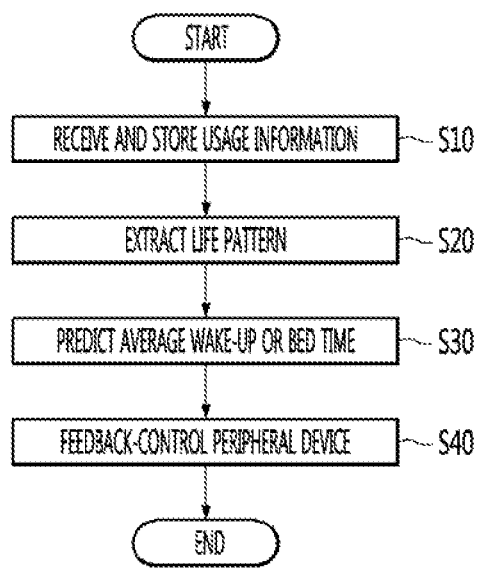
FIG. 6 is a flowchart illustrating an artificial intelligence-based method of providing wake-up and bed time information according to an embodiment of the present invention.

FIG. 6 is a flowchart illustrating an AI-based method of providing wake-up and bed time information according to an embodiment of the present invention.

Referring to FIG. 6, the artificial intelligence-based method of providing wake-up and bed time information may include receiving and storing usage information (S10), extracting a life pattern (S20), predicting an average wake-up or bed time (S30) and feedback-controlling a peripheral device (S40).

The step of receiving and storing the usage information (S10) is a process of receiving a usage history of an electronic device used by a user from the electronic device.

In this process, the communication unit 210a may receive usage information of the electronic device from the electronic device used by the user.

In addition, the communication unit 210a may transmit/receive data to/from external devices such as other AI devices 100a to 100e or the AI server 200 using wired or wireless communication technologies. For example, the communication unit 210a may transmit/receive sensor information, a user input, a learning model, a control signal, or the like with the external devices.

The memory 230a may store the usage information, and the processor 260a may load the usage information from the memory 230a, analyze the usage time of the electronic device to extract the life pattern of the user, and predict an average wake-up or bed time of the user based on the life pattern.

The step of extracting the life pattern (S20) is a process of loading the usage information and analyzing usage time of the electronic device.

The usage information may include at least one of mobile information indicating the time when the user has used the mobile device and the types of apps used at the time, motion information indicating the physical movement time of the mobile device, or peripheral device usage information indicating usage information of electronic devices which interwork with a network used by the user and operate based on IOT.

The step of predicting the average wake-up or bed time (S30) is a process of listing life patterns of the user through the above-described usage information and predicting the wake-up or bed time by comparing and analyzing the times.

The usage information may include mobile information, motion information, or peripheral device usage information.

The step of predicting the average wake-up or bed time of the user from mobile information (S30) may include arranging apps used by the user from the mobile information; determining whether a difference between an end time of and a start time of use of the apps is greater than or equal to a preset average sleep time; and extracting the start time or the end time of user of the app to predict the wake-up or bed time.

The processor 260a may receive apps used by the user from mobile information, and classify and sort the apps by date, time, weekday, or weekend.

The average sleep time may be input and set by the user and may be also extracted from mobile information.

The maximum period of time for which the apps are not used not may be a sleep time for each day in the mobile information, a blank time of 6-8 hours corresponding to the normal sleep time may be calculated as the sleep time within a period of time for which data is collected.

The step of predicting the average wake-up or bed time of the user based on the motion information may include recognizing a time when the movement of the mobile device is finished as the bed time, and recognizing a time when the movement of the mobile device is started as the wake-up time.

The processor 260a may perform filtering on a predicted time with mobile information primarily, with the motion information secondly, and with the peripheral control information thirdly by assigning priorities to the pieces of information. However, the present invention is not limited thereto, and the priorities may be changed for each user. For example, it may be possible to perform filtering based on peripheral device control information primarily, with respect to users who use more peripheral devices than the mobile device.

Figure 7:
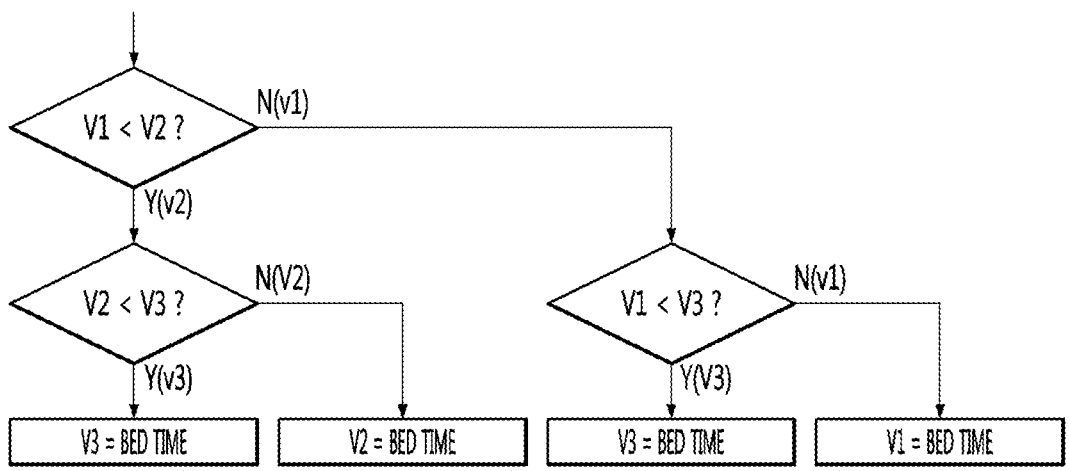
FIG. 7 is a flowchart of a process of predicting a bed time based on usage information according to an embodiment of the present invention.
Figure 8:
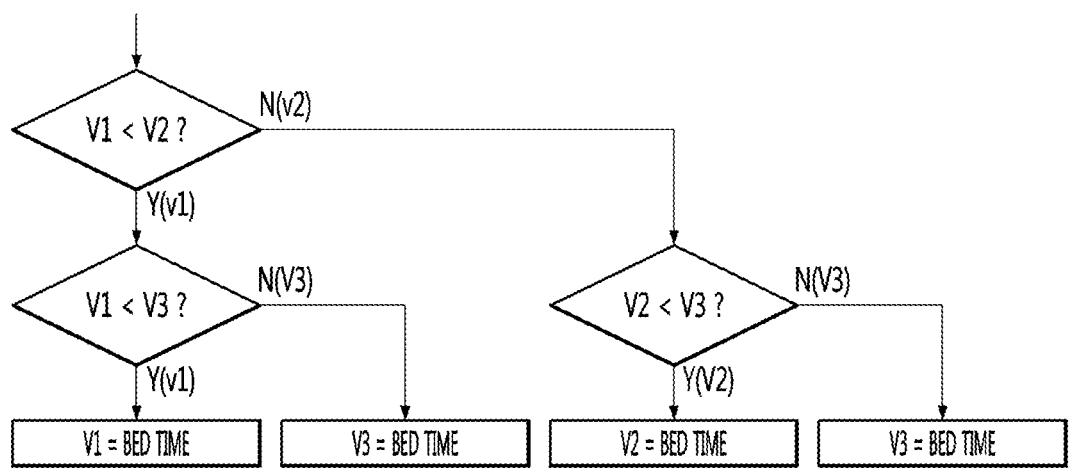
FIG. 8 is a flowchart of a process of predicting a wake-up time based on usage information according to an embodiment of the present invention.

FIG. 7 is a flowchart of the process (S301) of predicting a bed time based on usage information according to an embodiment of the present invention, and FIG. 8 is a flowchart of the process (S302) of predicting a wake-up time.

Referring to FIGS. 7 and 8, the average wake-up or bed time is predicted based on the usage information. In this process, the mobile information, the motion information, and the peripheral device control information may be compared to each other to predict the wake-up or bed time.

FIG. 7 illustrates the process of predicting the latest time at which activity is present as the bed time in each piece of usage information is shown, and FIG. 8 illustrates the process of predicting the earliest time at which activity is present as the wake-up time.

The processor compares or analyzes a start time and an end time of each usage information. The process may include predicting a wake-up or bed time based on the mobile information and the motion information, and comparing the wake-up or bed time predicted based on the mobile information and the motion information with the wake-up or bed time predicted based on the peripheral device usage information.

In each process, an algorithm for deriving a minimum value or a maximum value may be applied to calculate a wake-up or bed time based on information on the user's activity.

The processor 260a may extract a start time and an end time of use by the user, which correspond to at least one of mobile information, motion information, and peripheral device usage information included in the usage information, and, when there is no peripheral device or mobile device, exclude any one piece of information and then perform calculation. However, since most users have a mobile device and a peripheral device, the present invention may be implemented according to an embodiment of the present invention except for a special case.

The processor 260a may determine and perform an operation based on information determined or generated using a data analysis algorithm or a machine learning algorithm. To this end, the processor 260a may request, retrieve, receive, or utilize data of the running processor or the memory 230a.

The processor 260a may learn the user's life pattern through such usage information. In an embodiment of the present invention, the processor 260a may predict only wake-up and bed time information, but may control peripheral electronic devices which are used by the user.

Figure 9:
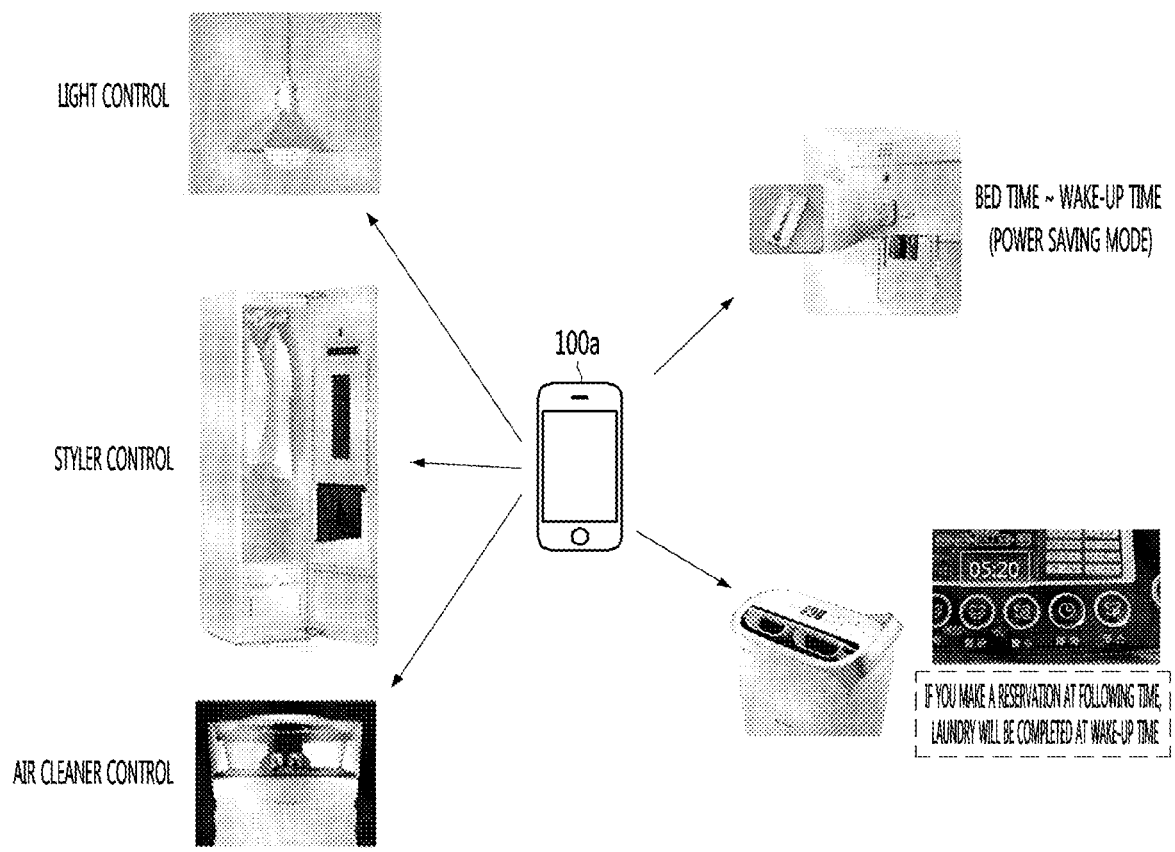
FIG. 9 is a diagram illustrating that a peripheral device is controlled using a predicted wake-up or bed time according to an embodiment of the present invention.

FIG. 9 is a diagram illustrating that a peripheral device is controlled using a predicted wake-up or bed time (S40) according to an embodiment of the present invention.

Referring to FIG. 9, according to an embodiment of the present invention, the processor 260a may set a predicted wake-up or bet time in a mobile device and automatically control a device interworking with the mobile device. However, the present invention is not limited thereto, and the processor 260a may directly control each device.

There are lights, a styler, an air purifier, a washing machine, and the like in the vicinity of the user, but is not limited thereto, and there may be IOT-based electronic devices interworking with a network.

The processor 260a may change the mode of each electronic device as well as on/off control of the electronic device, which may be performed via the mobile device or directly.

The processor 260a may slowly illuminate a light in accordance with a predicted wake-up or work time to induce the user to naturally wake up, control a styler or control a washing machine, a water purifier, a TV, and the like according to the wake-up time.

According to the artificial intelligence-based apparatus and method for providing wake-up and bed time information according to the embodiments of the present invention, it is possible to predict a more accurate wake-up or bed time based on various usage information, and provide various services using the predicted wake-up or bed time, thus providing a user with convenience.

According to the embodiments of the present invention, a more accurate wake-up or bed time may be predicted based on various usage information.

In addition, the present invention has the advantage of providing convenience to the user because it provides a variety of services using a predicted wake-up time or bed time.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

What is claimed is:

1. An artificial intelligence-based apparatus for providing wake-up and bed time information, comprising:
    a communicator configured to receive, from an electronic device used by a user, usage information for the electronic device, wherein the usage information includes: electronic device information indicating usage time of the electronic device and types of applications used during the usage time, motion information indicating when movement of the electronic device occurs, and peripheral device usage information indicating usage information of an internet of things (IoT)-based electronic device in communication with a network used by the user;
    a memory configured to store the usage information; and
    a processor configured to:
    load the usage information from the memory,
    analyze usage time of the electronic device,
    assign priorities to the electronic device information, the motion information, and the peripheral device usage information based on the usage time,
    extract a life pattern of the user, and
    predict an average wake-up time or bed time of the user based on the life pattern, wherein the average wake-up time or bed time is filtered by sequentially using the electronic device information, the motion information, and the peripheral device usage information according to the priorities.

2. The artificial intelligence-based apparatus of claim 1, wherein the processor is further configured to feedback-control a peripheral device of the user according to the wake-up or bed time.

3. The artificial intelligence-based apparatus of claim 1, wherein the processor is further configured to: sort applications used by the user based on the electronic device information and predict the average wake-up time or bed time by extracting a start time or an end time of use of the applications.

4. The artificial intelligence-based apparatus of claim 3, wherein the processor is further configured to; when a difference of the start time or the end time of use of the applications is greater than or equal to a predetermined average sleep time, recognize the end time of use of the applications as the average bed time, and predict the start time of use of the applications as the average wake-up time.

5. The artificial intelligence-based apparatus of claim 1, wherein the processor is further configured to: recognize a time when movement of the electronic device ends as the average bed time and recognize a time when movement of the electronic device starts as the average wake-up time based on the motion information.

6. The artificial intelligence-based apparatus of claim 1, wherein the processor is further configured to: recognize a time when use of a peripheral device ends as the average bed time and recognize a time when use of the peripheral device starts as the average wake-up time based on the peripheral device usage information.

7. The artificial intelligence-based apparatus of claim 2, wherein the processor is further configured to control an operation of the peripheral device according to the predicted average wake-up time or bed time.

8. An artificial intelligence-based method for providing wake-up and bed time information, comprising:
    receiving, from an electronic device used by a user, usage information for the electronic device, wherein the usage information includes: electronic device information indicating usage time of the electronic device and types of applications used during the usage time, motion information indicating when movement of the electronic device occurs, and peripheral device usage information indicating usage information of an internet of things (IoT)-based electronic device in communication with a network used by the user;
    loading the usage information from a memory,
    analyzing usage time of the electronic device,
    assign priorities to the electronic device information, the motion information, and the peripheral device usage information based on the usage time,
    extracting a life pattern of the user, and
    predicting an average wake-up or bed time of the user from the life pattern, wherein the average wake-up time or bed time is filtered by sequentially using the electronic device information, the motion information, and the peripheral device usage information according to the priorities.

9. The artificial intelligence-based method of claim 8, further comprising:
    feedback-controlling a peripheral device of the user according to the wake-up or bed time.

10. The artificial intelligence-based method of claim 8, wherein the predicting of the average wake-up or bed time of the user comprises:
    sorting applications used by the user based on the electronic device information,
    determining whether a difference of a start time or an end time of use of the applications is greater than or equal to a predetermined average sleep time, and
    predicting the average wake-up or bed time by extracting the start time or the end time of use of the applications.

11. The artificial intelligence-based method of claim 8, wherein the predicting of the average wake-up or bed time of the user comprises:
    recognizing a time when movement of the electronic device ends as the average bed time and recognizing a time when movement of the electronic device starts as the average wake-up time based on the motion information.

* * * * *